(12) United States Patent
Bäumer et al.

(10) Patent No.: US 11,098,801 B2
(45) Date of Patent: Aug. 24, 2021

(54) POLE CAP WITH PRESSURE CONNECTION ELEMENT FOR PRESSURE VESSELS

(71) Applicant: NPROXX B.V., Rk Heerlen (NL)

(72) Inventors: Thomas Bäumer, Hückelhoven (DE); Claus Castenholz, Euskirchen (DE)

(73) Assignee: NPROXX B.V.

( * ) Notice: Subject to any disclaimer, the term of this patent is extended or adjusted under 35 U.S.C. 154(b) by 97 days.

(21) Appl. No.: 16/488,394

(22) PCT Filed: Feb. 16, 2018

(86) PCT No.: PCT/EP2018/053860
§ 371 (c)(1),
(2) Date: Aug. 23, 2019

(87) PCT Pub. No.: WO2018/153779
PCT Pub. Date: Aug. 30, 2018

(65) Prior Publication Data
US 2020/0088299 A1   Mar. 19, 2020

(30) Foreign Application Priority Data

Feb. 23, 2017  (EP) .................................. 17157536

(51) Int. Cl.
*F16J 13/12* (2006.01)
*F17C 13/06* (2006.01)

(52) U.S. Cl.
CPC .............. *F16J 13/12* (2013.01); *F17C 13/06* (2013.01); *F17C 2201/0104* (2013.01);
(Continued)

(58) Field of Classification Search
CPC .. F16J 13/12; F17C 13/06; F17C 1/06; B65D 41/0435; B65D 41/04
(Continued)

(56) References Cited

U.S. PATENT DOCUMENTS 2,005,087 A  *  6/1935  Kamack ................ B21C 37/296
                                               285/205
3,459,369 A  *  8/1969  Marks ................... B01L 3/5021
                                                494/38
(Continued)

FOREIGN PATENT DOCUMENTS

DE    2152123 A1    5/1973
DE    2538433 A1    3/1977
(Continued)

OTHER PUBLICATIONS

International Search Report for PCT/EP2018/053860 dated May 25, 2018.

*Primary Examiner* — Robert J Hicks
(74) *Attorney, Agent, or Firm* — Tarolli, Sundheim, Covell & Tummino LLP

(57) ABSTRACT

A pole cap is presented made of a plastic material for the pressure-tight closure of a pressure vessel. The pole cap comprises an inner side for the later closure of the pressure vessel, an outer side for the superwinding with a fiber composite material after closure of the pressure vessel and a neck-shaped open duct, which protrudes outwardly from the outer side and has an inner contour, each made of plastic material, and comprises a pressure port element connected to the duct for the closure of the duct, wherein the pressure port element comprises a seal cone made of metal with a first section protruding outwardly through the duct and a second section tapering at least in the area of the duct in a cone-shaped manner in the direction of the first section.

14 Claims, 6 Drawing Sheets

(52) U.S. Cl.
CPC .............. *F17C 2203/0636* (2013.01); *F17C 2203/0663* (2013.01); *F17C 2205/0305* (2013.01); *F17C 2205/0311* (2013.01); *F17C 2209/2118* (2013.01); *F17C 2209/221* (2013.01)

(58) Field of Classification Search
USPC .......... 220/589, 588, 586, 581, 582, 203.19, 220/203.01, 303, 304, 288; 206/0.6
See application file for complete search history.

(56) References Cited

U.S. PATENT DOCUMENTS

| | | | | |
|---|---|---|---|---|
| 7,032,767 | B2 * | 4/2006 | Funck | F17C 1/16 |
| | | | | 220/581 |
| 7,971,852 | B2 * | 7/2011 | Otsubo | F16L 55/1108 |
| | | | | 251/144 |
| 8,561,637 | B2 * | 10/2013 | Petrarca | F16K 17/196 |
| | | | | 137/493.5 |
| 9,353,910 | B2 * | 5/2016 | Ulekleiv | F17C 1/06 |
| 2008/0187697 | A1 | 8/2008 | Amano | |
| 2014/0239001 | A1 * | 8/2014 | Ulekleiv | F17C 1/06 |
| | | | | 220/589 |
| 2015/0292679 | A1 * | 10/2015 | Ehgartner | F17C 13/06 |
| | | | | 220/581 |
| 2016/0123538 | A1 | 5/2016 | Nakamura | |
| 2018/0292046 | A1 * | 10/2018 | Nishibu | F17C 1/16 |

FOREIGN PATENT DOCUMENTS

| | | |
|---|---|---|
| EP | 0271483 A2 | 6/1988 |
| JP | H10231997 A | 9/1998 |
| WO | 2011/047752 A1 | 4/2011 |

* cited by examiner

POLE CAP WITH PRESSURE CONNECTION ELEMENT FOR PRESSURE VESSELS

RELATED APPLICATIONS

The present invention is a U.S. National Stage under 35 USC 371 patent application, claiming priority to Serial No. PCT/EP2018/053860, filed on 16 Feb. 2018; which claims priority of EP 17157536.8, filed on 23 Feb. 2017, the entirety of both of which are incorporated herein by reference.

FIELD OF THE INVENTION

The invention relates to a pole cap made of a plastic material for the pressure-tight closure of a pressure vessel; a pressure vessel with such a pole cap as well as to a method for producing such a pole cap as well as such a pressure vessel.

BACKGROUND OF THE INVENTION

The market for fiber-reinforced pressure vessels of fiber composite material grows continuously. The increasing extraction of natural gas and fracking gas requires a storage in pressure vessels, especially in countries without a corresponding pipeline network. In addition, there is the automobile sector, which is highly involved in the development of fuel cell vehicles, in which the fuel is to be stored in the form of gaseous hydrogen in pressure vessels in a gaseous or liquid state under high pressure. Light pressure vessels are desired for the transport of the pressure vessels, because a transport of pressure vessels with high vessel weights consumes an unnecessarily large amount of energy and therefore causes excessively high transport costs.

Currently used fiber-reinforced (CFK) pressure vessels have a cylindrical central part, on which pole caps for the closure of the central part are located on both sides and which are produced, for example, using a fiber winding method. A liner (inner vessel for the pressure vessel) is used, which, on the one hand, acts as a winding core and, on the other hand, also ensures the impermeability of the vessel. For producing the pressure vessel this liner is then superwound with fiber composite material for reinforcement, so that the resulting pressure vessel is given its stability. The Type 3 pressure vessels use a metallic liner of aluminum or steel, whereas the Type 4 pressure vessels use a plastic liner. The latter pressure vessels satisfy the technical requirements and can be produced cost-effectively. For example, plastic liners can be produced by means of a welding method, by means of a so-called rotomolding method or by means of a blowing method. In a welding method an extruded tube of a corresponding diameter, wall thickness and length is produced and a suitable pole cap is welded onto both sides. In doing so, both sides of the pole caps can be reached, which is not the case with the other methods.

Problematic with these pressure vessels, amongst other things, is the necessary metallic port for a pressure vessel valve to such CFK pressure vessels with plastic liner. In doing so, the metallic connecting piece (also called boss or liner connection) has to be easily mountable and remain connected to the liner in a leak-tight manner over the entire service life of the pressure vessel.

It would therefore be desirable to provide a connecting piece for the inner vessel (liner connection), which is easily to mount and remains connected to the liner in a leak-tight manner throughout the entire service life.

SUMMARY OF THE INVENTION

It is therefore an object of the invention to provide a connecting piece for the inner vessel, which is easy to mount and remains connected to the inner vessel (liner) in a leak-tight manner throughout the entire service life.

This object is achieved by a pole cap for the pressure-tight closure of a pressure vessel, wherein the pole cap comprises an inner side for the later closure of the pressure vessel, an outer side for the superwinding with a fiber composite material after closure of the pressure vessel and a neck-shaped open duct with an inner contour protruding outwardly to the outer side, each made of plastic material, and a pressure port element connected to the duct for the closure of the duct, wherein the pressure port element comprises a seal cone made of metal with a first section protruding outwardly through the duct and a second section tapering at least in the area of the duct in a cone-shaped manner in the direction of the first section, which is held by means of a fixing means arranged on the first section from the outside in a pressure-tight press fit in the inner contour.

Pressure vessels within the meaning of the invention are all vessels suitable for the storage of fluids and gases with a pressure increased relative to the surroundings of the pressure vessel, which comprise an inner vessel made of plastic material and a reinforcement made of fiber composite material. In general, these pressure vessels are cylinder-shaped with outwardly curved terminations on both sides of the cylinder-shaped central part. These terminations are referred to as pole caps and serve for the pressure-tight closure of the central part. In the later pressure vessel, the inner side of the pole cap here is part of the inner wall of the pressure vessel facing the filling (fluid or gas) of the pressure vessel. Accordingly, the outer side is the opposite side of the pole cap. For the reinforcement of the pressure vessel, said outer side is superwound with a fiber composite material, which can at the same time form the outer side of the pressure vessel. After the welding of the pole caps to the central part, an inner vessel is produced, whose pressure tightness only depends on the pressure tightness of the pole cap with the pressure port element, in particular the seal cone. With the inventive pole cap the pole cap is configured in a pressure-tight manner and therefore the entire inner vessel is configured in a pressure-tight manner.

In order to provide the pressure vessel with a filling or to be able to remove this filling from the pressure vessel, the pressure vessel must comprise a reversibly lockable opening. With pressure vessels, such an opening is arranged in one of the pole caps via a neck-shaped open duct protruding outwardly from the outer side, and having a pressure port element with an inner contour for the closure of the duct arranged therein. The cone-shaped contour of the seal body makes it possible that a seal cone inserted from the inner side of the pole cap into the duct takes a press fit in the inner contour of the neck-shaped duct. In this case, with inner contours of the neck-shaped duct, which are not adapted to the cone shape of the second section of the seal cone, the seal cone can, for example, displace the material of the pole cap in the area of the inner contour in such a manner, that the inner contour clings to the cone-shaped contour of the second section. The seal cone, together with other components, then forms the pressure port element via which the filling can be introduced into or discharged from the pressure vessel. A fixing means, arranged from the outer side on the pressure port element (for example a clamping nut or a spring ring snapping into the seal cone) has the effect that the seal cone is pulled into the duct (pressed) or remains in the pulled-in (pressed) position and thus the outer side thereof rests in the inner side of the duct in such a way, that a filling of the pressure vessel, being under excess pressure, cannot escape through the duct.

Because of weight and cost reasons, the pole cap per se consists of plastic material (as well as the remaining inner vessel). Plastic material can deform over the operating time due to the pressure prevailing in the pressure vessel, so that leakage can occur between connecting piece and pole cap. Due to its construction with a specially configured duct and a corresponding pressure port element, the pole cap according to the invention prevents that the plastic material of the neck-shaped duct can deform and therefore provides a pole cap with connecting piece for the inner vessel, which is easy to mount and remains connected to the pole cap throughout the entire service life and thereby with the later inner vessel (liner) in a leak-proof manner. The structure of the pole cap according to the invention with a pressure port element was changed in such a manner, that even with very high surface pressures as a result of the internal pressure of the pressure vessel, the plastic material can no longer flow away on the connecting surface between the pressure port element and the neck-shaped duct, because the plastic material here is chambered by the cone-shaped shape of the inner contour of the duct and the seal cone. Owing to the conical structure of the seal cone and the inner contour correspondingly resting against the seal cone in a form-fit manner, a narrowing gap results in an outward direction, which effects the sealing of the pressure port. Plastic material would need to flow through this narrowing gap, if it wanted to flow away under the surface pressure of the seal cone. But this would be only possible by further increasing the surface pressure, which does not occur as the inner contour of the duct rests on the cone-shaped contour of the seal cone and with the large support area thus achieved, with a very good sealing effect, only a low surface pressure per surface unit relative to the prior art is caused. In the prior art, the seal cone and the duct are connected to each other only via a thread, in which high local pressures are produced by means of which the plastic material is deformed under the seal cone and can flow away under the seal cone in case of too high surface pressure. In the prior art, a compromise is therefore necessary between tightening torque and consequently tightness under high pressures and excessive surface pressure and thus the flowing-away of the plastic material, which results in pressure vessels of the prior art being not suitable for very high pressures. On the contrary, pressure vessels with the pole cap according to the invention are suitable up to the pressures at which the fiber reinforcement of the pressure vessel would fail. With the construction according to the invention the sealing effect of the seal cone is further increased under high pressure in the pressure vessel. To this end, the seal cone is pressed from the direction of the pressure vessel interior into the neck opening of the duct, which increases the sealing effect. By means of the fixing means on the other side of the neck opening of the duct the seal cone is pulled until it reaches the end position in a torque-controlled manner or until it latches into the fixing means and is thus held in its intended, sealing position. Owing to the design of the seal cone, the surface area of the seal cone facing the inner side of the pressure vessel (high pressure) is bigger than the surface area of the seal cone facing the outer side of the pressure vessel (low pressure, for example normal pressure). The difference of the surface areas multiplied by the gas pressure creates a force proportional to the pressure in direction of the sealing effect, thus the gas pressure produces a higher sealing effect with higher pressure. The pole cap having a pressure port element according to the invention is thus redundant against leaks.

In one embodiment, the inner contour tapers at least in an area of the duct in a cone-shaped manner outwardly along the duct, wherein the cone-shaped inner contour is adapted to the cone-shaped second section. Thus, the force fit between the seal cone and inner contour is improved, which improves the sealing effect and the seat of the seal cone in the neck-shaped duct. In one preferred embodiment the cone-shaped inner contour is to that end adapted to the cone shape of the second section of the seal cone in an accurately fitting manner. This adapted cone-shaped inner contour allows for a seal cone from the inner side of the pole cap, correspondingly adapted to the shape of this inner contour, to be inserted into the duct, which leads to a further improvement.

In one embodiment, the cone-shaped inner contour of the duct extends from the inner side to the neck end on the outer side. A seal cone shaped in a manner correspondingly adapted to the extent of the inner contour has thus a larger contact area with the inner contour, which distributes the applied pressure force of the seal cone onto the inner contour on a bigger surface and thus the surface pressure per surface unit and thereby the risk of the plastic material of the neck-shaped duct flowing away is further reduced.

In another embodiment, the seal cone protrudes with its second section from the duct beyond the inner side. As a result, the clamping nut, for example, can be screwed from the outside onto the seal cone, which facilitates mounting of the seal cone in the neck-shaped duct.

In another embodiment the pole cap further comprises an attachment element for attaching on to the neck-shaped duct, wherein the attachment element comprises a first contact area, which extends in planar fashion in radial direction from the neck-shaped duct along the outer side and is adapted to the contour of the outer side and is provided for the superwinding with the fiber composite material, and a second contact area, whose inner shape is adapted to an outer shape of the neck-shaped duct in such a manner, that the second contact area prevents a deforming of the outer shape of the neck-shaped duct in radial direction. After the assembly of the attachment element onto the neck-shaped duct the pole cap with attachment element is superwound with fiber composite material in the same manner as the pole cap according to the invention without such an attachment element. The radial direction in this case refers to the direction pointing away from the center of the duct. With cylindrical pressure vessels the pole caps are likewise configured in a circular manner in terms of their circumference. In general, the connection element is arranged in the center of the pole cap, as a result of which the radial direction coincides with the radial direction to the symmetry axis (cylinder axis) of the pressure vessel. The first contact area of the attachment element can thereby be attached to the outer side, which is specifically configured in the contact area for the attachment element, for example the outer side can have a depression receiving the contact area, so that the pole cap with attachment element has the same outer shape as a pole cap, which is not provided to be additionally equipped with an attachment element. Softer plastic materials, such as polyethylene, can also be used here for the pole caps or the inner vessel of the pressure vessel, because in the case of the pole cap according to the invention, the sealing effect is maintained as a result of its configuration and there is no danger that the pressure vessel becomes prematurely untight under high pressure or after a plurality of load changes.

In a preferred embodiment, the outer shape of the duct comprises a circumferential edge at the neck end, preferably the edge is a planar surface perpendicular to the longitudinal direction of the duct or the later pressure vessel. In this case, the second contact area covers the circumferential edge at least partially, so that a deforming of the outer shape of the duct is in addition also prevented perpendicular to the radial direction.

In another embodiment, the second contact area further extends along the first section of the seal cone, wherein the first section comprises a suitably arranged seal circumferentially around the first section for pressure-tight sealing with respect to the second contact area of the attachment element.

In another embodiment, the fixing means, which is arranged from the outside on the first section, is a clamping nut screwed onto the first section, with which the second section is pulled into the inner contour for the pressure-tight sealing. The clamping nut can thereby, on the one hand, be fastened directly or indirectly to the seal cone via a thread and pulls, on the other hand, directly or indirectly at the neck-shaped duct, so that the seal cone is pressed against the inner contour of the duct.

In another embodiment, the attachment element further comprises a third area in longitudinal direction above the second contact area, which comprises an inner side facing the first section, wherein the inner side of the third area is arranged in such a manner that a circumferential gap is formed between the inner side and the first section of the seal cone in radial direction, wherein the gap is provided and designed for the receiving of the clamping nut. The longitudinal direction here refers to the direction along the duct from inside to outside or the direction along the cylinder axis of the later pressure vessel. By means of the third area, the clamping nut is protected from outer mechanical stress.

In another embodiment, the second contact area forms a support area for the clamping nut, so that in addition, the attachment element by means of the clamping nut is fastened via the support area on the pole cap pressing onto the neck-shaped duct. Thus, the attachment element can be likewise easily fastened to the pole cap and via its shape-supporting effect to the neck-shaped duct.

In another embodiment, the inner shape of the second contact area of the attachment element extends along the first section of the seal cone and has a recess in an area opposite the first section, in which the fixing means, arranged from the outside on the first section, is arranged in the type of an elastic spring ring and the first section of the seal cone comprises a ring recess, which is adapted to the spring ring, in a position adapted thereto along the longitudinal axis, into which the spring ring, after a pressing-in of the seal cone into the duct, latches and thus fixes the seal cone in the pressure-tight press fit in the inner contour. The fixing of the seal cone by means of the spring ring in a position defined by spring ring and ring recess, allows for the simple and fast establishing of a press fit, which constitutes a pressure-tight seat of the seal cone in the duct. The spring ring can be produced from conventional materials for spring rings using conventional methods, as a result of which the spring ring has its usual elasticity.

In another embodiment, the attachment element is screwed with its second contact area onto the outer shape of the neck-shaped duct, for example by means of a self-tapping thread. As a result, the attachment element can be fastened to the neck-shaped pole cap, independent of a clamping nut, which is screwed thereto later. The possibly additional fastening of the attachment element by means of a screw connection and pressing thereagainst by means of the clamping nut increases the close fit of the attachment element on the neck-shaped duct of the pole cap. In another embodiment, the attachment element and neck-shaped duct are in this case configured in such a manner, that the attachment element is screwed from above onto the neck-shaped duct, until the first direct contact of the first contact area on the outer side. As a result, the attachment element is securely positioned on the outer side and it is easy for the fitter to detect whether the positioning is correct.

In another embodiment, the plastic material of at least the neck-shaped duct of the pole cap is a soft plastic material and the second contact area of the attachment element is provided with a thread for self-cutting screwing onto the pole cap. As a result, an arrangement of a thread on the neck-shaped duct is prevented, which reduces the production effort.

The invention relates further to a fiber-reinforced pressure vessel comprising an inner vessel made of a plastic material, comprising a cylinder-shaped central part and two pole caps each closing the central part on both sides and an outer layer made of fiber composite material and wound on the inner vessel, wherein one of the pole caps is a pole cap according to the invention. So that a filling can be stored under pressure in this pressure vessel, the cylinder surfaces of the central part are closed with the pole caps. In the case of a hemispherical geometry of the pole caps, a tension ratio of 2:1 between the circumferential tension (tension on the inner wall of the cylindrical middle part) and axial tension (tension on the cover surfaces) would exist, which would put a great stress on the edge area between the central part and the pole caps. These geometric considerations apply to all pressure vessels, even for those with an inner vessel and an outer layer wound over the inner vessel to reinforce the inner vessel, for example with an inner vessel made of plastic material. On the one hand, such vessels have a very low weight, which, for example, is important for usage in transport means, and, on the other hand, fillings such as, for example hydrogen, can be stored under high pressure with low loss, since plastic has very low hydrogen permeability and the required strength is provided by the outer layer of fiber composite material. The pressure vessel according to the invention thus comprises an inner vessel with pole caps, which are preferably configured as dome-type pole caps, having a shape that differs from a hemisphere, which have a stronger curvature in the lid edge area adjacent to the cylindrical central part of the inner vessel in comparison to a hemisphere surface, while the central area of the pole caps has a smaller curvature in comparison to a hemisphere surface. With this dome-type pole cap, the stiffness and load jump and the tension ratio caused as a result thereof between circumferential direction (central part) and axial direction (pole cap surfaces) can be absorbed particularly well by first fibers arranged axially on the pole cap in the central area. Such a particularly suitable dome-shaped pole cap is also referred to as isotensoid. An isotensoid thereby refers to a shape, which, wound on top of an outer layer of fiber composite material produces a constant tension in the fibers at all points of the fiber path.

In general, a fiber composite material consists of two main components, in this case fibers, embedded in a matrix material that produces the solid composite between the fibers. The fiber composite material can thereby be wound with one or more fibers, wherein the fiber(s) is/are wound closely together in contact. This creates a fiber layer on which the fibers are wound in further fiber layers, until the fiber composite material has the desired thickness and constitutes a corresponding fiber layer with this thickness. In one embodiment, the fiber layers of first and/or further fibers, for example second fibers, each comprise multiple fiber layers. The composite provides the fiber composite material with higher-quality properties, such as, for example, a greater strength than either of the two individual components involved could provide. The reinforcement effect of the fibers in the fiber direction occurs when the elasticity modulus of the fiber is greater in the longitudinal direction than the elasticity modulus of the matrix material, when the elongation at break of the matrix material is greater than the elongation at break of the fibers and when the breaking strength of the fibers is greater than the breaking strength of the matrix material. Fibers of all kinds can be used, for example glass fibers, carbon fibers, ceramic fibers, steel fibers, natural fibers or synthetic fibers. Thermosets, elastomers or thermoplastics can be used, as matrix materials, for example. The material properties of the fibers and matrix materials are known to the person skilled in the art, so that the person skilled in the art can select a suitable combination of fibers and matrix materials for producing the fiber composite material for the respective application. In this case, individual fiber layers in the fiber composite area can comprise a single fiber or several identical or different fibers.

The invention further relates to a method for producing a pole cap according to the invention made of plastic material for the pressure-tight closure of a pressure vessel comprising the steps of:
provision of the pole cap with an inner side for the later closure of the pressure vessel, an outer side for the superwinding with a fiber composite material after closure of the pressure vessel and a neck-shaped duct protruding from the outer side outwardly with an inner contour for the subsequent introduction of a seal cone as part of a pressure port element;
introduction of a seal cone made of metal from the inner side into the duct, wherein the seal cone comprises a first section and a second section tapering at least in the area of the duct in a cone-shaped manner in direction of the first section until the first section protrudes outwardly from the neck-shaped duct;
establishing a pressure-tight sealing between seal cone and inner side of the duct by means of fixing means, arranged from the outside on the first section, which holds the seal cone in a pressure-tight press fit in the inner contour.

Thus, a method is provided, with which a pole cap with a connecting piece for the inner vessel is easy to produce, which is suitable to remain connected in a leak-proof manner with the inner vessel (liner) during the entire service life.

In another embodiment, the method comprises the further step of attaching an attachment element to the neck-shaped duct for preventing a deforming of the outer shape of the duct in radial direction, wherein the attachment element comprises a first contact area, which extends planarly in radial direction from the neck-shaped duct along the outer side and is adapted to the contour of the outer side and is provided for the superwinding with the fiber composite material, and a second contact area with an inner shape adapted to an outer shape of the neck-shaped duct.

In an embodiment of the method, wherein the fixing means, which is arranged from the outside on the first section, is a clamping nut or a spring ring, the step for producing the pressure-tight sealing comprises the step of
exerting a tensile force on the seal cone by means of a clamping nut screwed onto the first section from the outside, or
pressing-in of the seal cone into the duct, wherein the seal cone comprises a ring recess in the first section, which is adapted to the spring ring, in a position adapted thereto along the longitudinal axis, and subsequent lock-in of the spring ring into the ring recess of the seal cone, wherein the spring ring is held elastically in a recess in the inner shape of the second contact area of the attachment element, which extends along the first section of the seal cone.

The invention further relates to a method for producing a fiber-reinforced pressure vessel according to the invention, comprising the steps of:
provision of a cylinder-shaped central part made of plastic material;
provision of two pole caps made of plastic material for the closure of the central part, of which at least one of the pole caps is a pole cap according to the invention;
welding of the pole caps comprising the pole cap with already connected pressure port element to the central part for producing an inner vessel made of plastic material; and
superwinding of the inner part with fiber composite material for producing the fiber-reinforced pressure vessel.

BRIEF DESCRIPTION OF THE FIGURES

These and other aspects of the invention are shown in detail in the figures as follows.

DETAILED DESCRIPTION OF THE EXEMPLARY EMBODIMENTS

Figure 1:
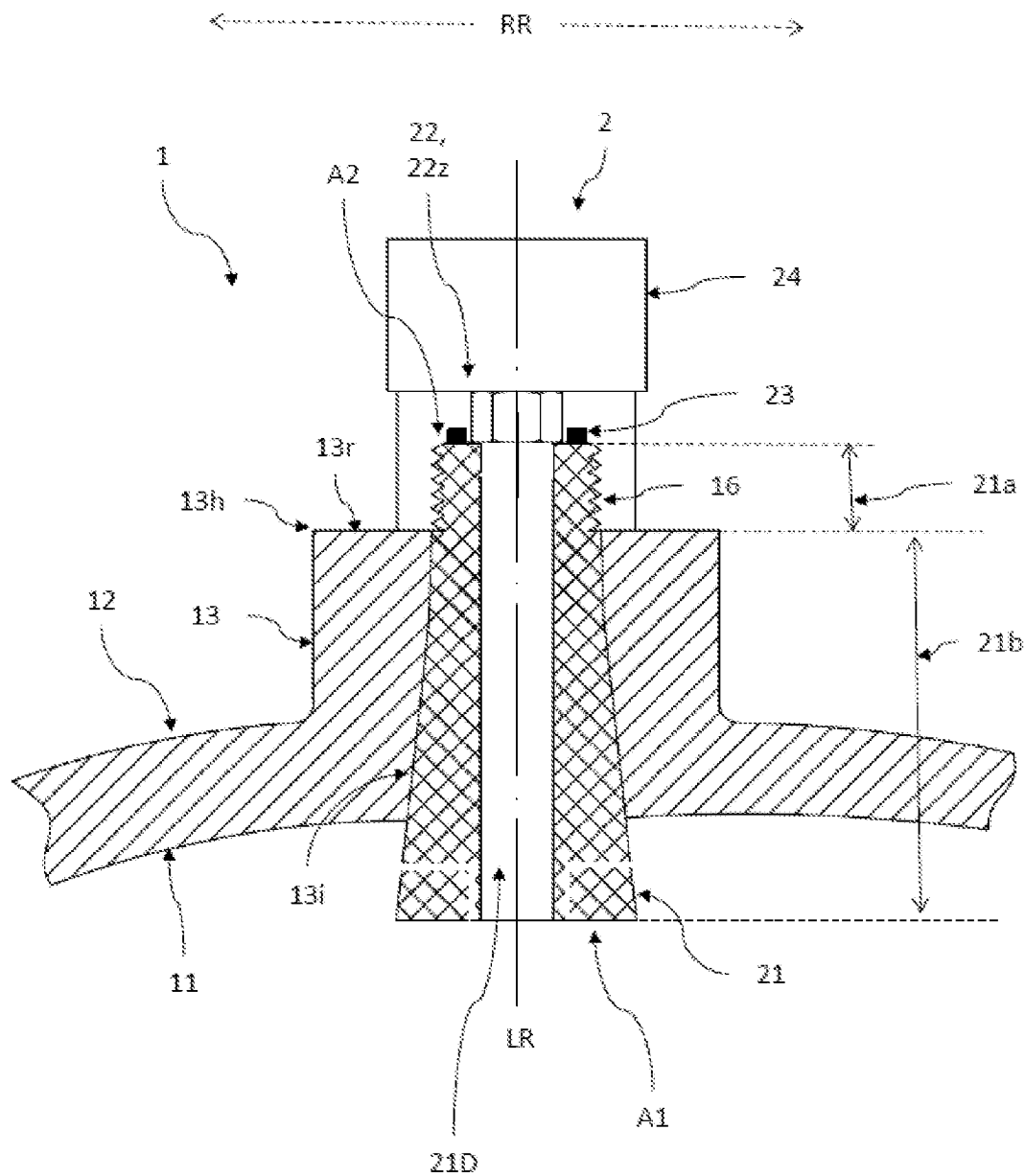
FIG. 1: an embodiment of a pole cap according to the invention with a pressure port element.

FIG. 1 shows an embodiment of a pole cap 1 according to the invention with a pressure port element 2 suitable for the pressure-tight closure of a pressure vessel 100. The pole cap 1 thereby comprises an inner side 11, which faces the interior of the pressure vessel for the later closure of the pressure vessel 100, an outer side 12 provided for the superwinding with a fiber composite material 3 after closure of the pressure vessel 100 and a neck-shaped open duct 13 protruding outwardly to the outer side with a cone-shaped inner contour 13*i* in a second section between inner side 11 and outer side 12, which tapers outwardly along the duct 13 in this area, each made of plastic material. The pole cap 1 further comprises a pressure port element 2 connected to the duct 13 for the closure of the duct 13, wherein the pressure port element 2 comprises a seal cone 21 made of metal with a first section 21*a* protruding outwardly through the duct 13 and with a second section 21*b* correspondingly adapted to its cone-shaped inner contour 13*i* at least in the area of the duct 13. The section 21*b* has an outer cone shape, corresponding to the inner contour 13*i*, in a longitudinal direction LR of the duct 13 with a circular first surface A1 on or above the inner side 11 and a circular second surface A2, facing the outer side 12 of the pole cap 1, wherein in this embodiment the first and second surfaces A1 and A2 are aligned perpendicular to the longitudinal direction of the duct 13. The seal cone 21 furthermore has a cylinder-shaped passage channel 21D in its interior for the filling of the later pressure vessel 100 with fluids or gasses or for the discharge thereof. Because the first surface A1 is bigger than the second surface A2 and the high internal pressure of the pressure vessel 100 is applied to the first surface A1, in correspondence to the surface ratio between first and second surface A1, A2, the seal cone 21 is already pressed, due to the internal pressure in the pressure vessel, into the cone-shaped inner contour 13*i* of the duct 13, so that a good sealing effect between seal cone 21 and duct 13 is ensured. In addition, the seal cone 21 is pressed by means of a clamping nut 22*z*, screwed onto the first section 21*a* from the outside, as the fixing means 22, which is arranged from the outside on the first section 21*a*, for the pressure-tight sealing into the cone-shaped inner contour 13*i*, in that the clamping nut at the neck end 13*h* of the neck-shaped duct 13 presses on the circumferential edge 13*r* of the duct 13 at the neck end 13*h* and, as a result, pulls the seal cone 21 into the duct 13. By means of the clamping nut 22*z* a fixed seat of the seal cone 21 in the duct 13 is also ensured in the stage, where the pole cap is not yet welded onto the central part of the inner vessel or the later pressure vessel 100 is not yet applied with internal pressure. To this end, the seal cone 21 protrudes out of the duct beyond the inner side 11 with its second section 21*b*, which facilitates the assembly of the clamping nut 22*z*. The shape of the clamping nut 22*z* and the corresponding thread 16 in the second section 21*b* of the seal cone 21 can be suitably designed by a person skilled in the art. Preferably, the cone-shaped inner contour 13*i* of the duct 13 can thereby also extend from the inner side 11 until the neck end 13*h* on the outer side 12.

Figure 2:
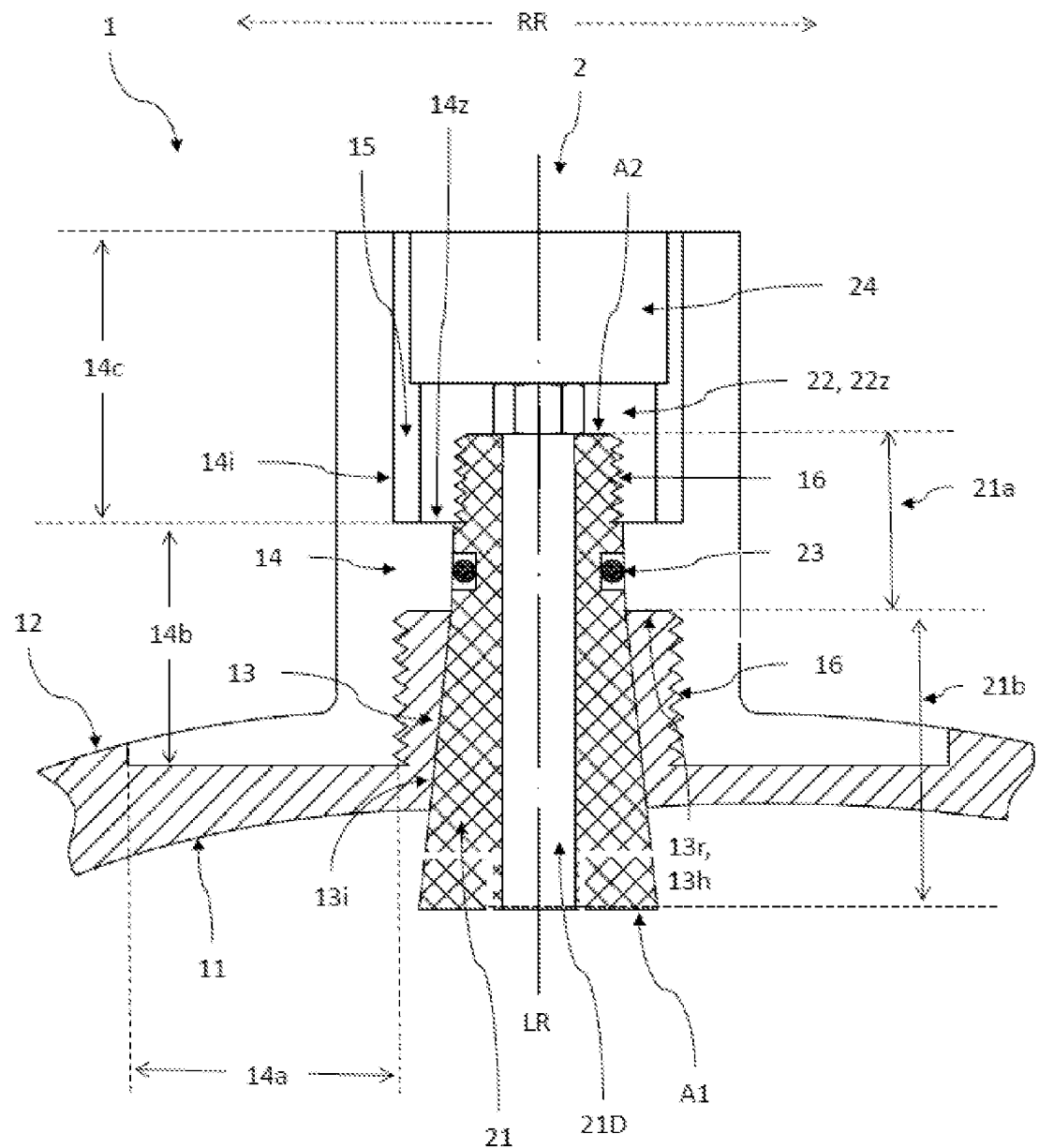
FIG. 2: another embodiment of a pole cap according to the invention with a pressure port element.

FIG. 2 shows another embodiment of a pole cap 1 according to the invention with a pressure port element 2. In this embodiment, the pole cap 1 further comprises, in addition to the pole cap of FIG. 1, an attachment element 14, which is attached to the neck-shaped duct 13. The attachment element 14 comprises thereby a first contact area 14*a*, which extends in planar fashion in radial direction from the neck-shaped duct 13 along the outer side 12 and is adapted to the contour of the outer side 12 and is provided for the superwinding with fiber composite material 3. The outer side 12 has a depression to that end, by which the attachment element 14 is accommodated, respectively received in such a manner that the contour of the outer side 12 outside the first contact area 14*a* is continued without change in the area with the first contact area 14*a* on the outer side 12 in direction of the duct 13. The attachment element 14 further comprises a second contact area 14*b* for covering the neck-shaped duct along the longitudinal direction of the duct 13. The outer shape of the neck-shaped duct 13 here has a cylindrical shape around the cone-shaped inner shape 13*i*. Correspondingly, the inner shape of the second contact area 14*b* likewise has a cylindrical shape, which is adapted to the dimension of the outer shape of the duct 13, so that the second contact area 14*b* prevents a deforming of the outer shape of the neck-shaped duct 13 in radial direction RR. In addition, in this embodiment the outer shape of the duct 13 comprises a circumferential edge 13*r* at the neck end 13*h*, wherein the second contact area 14*b* is shaped in such a way, that it covers the circumferential edge 13*r* upward (perpendicular to the longitudinal direction), so that a deforming of the outer shape of the duct 13 is also prevented perpendicular to the radial direction RR. The second contact area 14*b* further extends along the first section 21*a* of the seal cone, wherein here, in the first section 21*a* is arranged a seal 23 circumferentially around the first section 21*a*, for example an O-ring seal, for the pressure-tight sealing with respect to the second contact area 14*b* of the attachment element 14. Here, the attachment element 14 further comprises a third area 14*c*, arranged in longitudinal direction LR above the second contact area 14*b*. The third area 14*c* comprises an inner side 14*i* facing the first section 21*a*, which defines a circumferential gap 15 between the inner side 14*i* and the first section 21*a* of the seal cone 21 in radial direction RR, so that in this gap 15, the clamping nut 22*z* of a fixing means 22, which is arranged from the outside on the first section 21*a*, can be arranged on the seal cone 21 and be screwed on it. The second contact area 14*b* below the third area 14*c* thereby forms a support area 14*z* for the clamping nut 22*z*, so that the attachment element 14 by means of the clamping nut 22*z* is additionally fastened via the support area 14*z* on the pole cap 1 pressing on the neck-shaped duct 13. The shape of the clamping nut 22*z* and the corresponding thread 16 in the second section 21*b* of the seal cone 21 can be suitably designed by a person skilled in the art. Additionally or alternatively, and according to other embodiments, in this embodiment, the attachment element 14, with its second contact area 14*b*, is screwed onto the outer shape of the neck-shaped duct 13, wherein in this case, the attachment element 14 is screwed from above until the direct contact of the first contact area 14*a* with the outer side 12 onto the neck-shaped duct 13. In this case, the second contact area 14*b* of the attachment element 14 can comprise a self-tapping thread 16 for the purpose of this screwing-on step, insofar as the plastic material of at least the neck-shaped duct 13 of the pole cap 1 is a soft plastic material. In this case, no thread would be arranged on the outer shape of the neck-shaped duct 13. If the plastic material was too hard for self-tapping, corresponding threads would need to be arranged on the outer shape of the neck-shaped duct 13 as well as on the inner shape of the second contact area 14*b*. For the inlet and outlet of fluids or gasses in/out of the pressure vessel a valve attachment is arranged on the seal cone 21, which can comprise corresponding inlet and/or outlet openings, an operating device for the inlet and/or outlet openings and, if necessary, other components, such as a pressure display.

Figure 3:
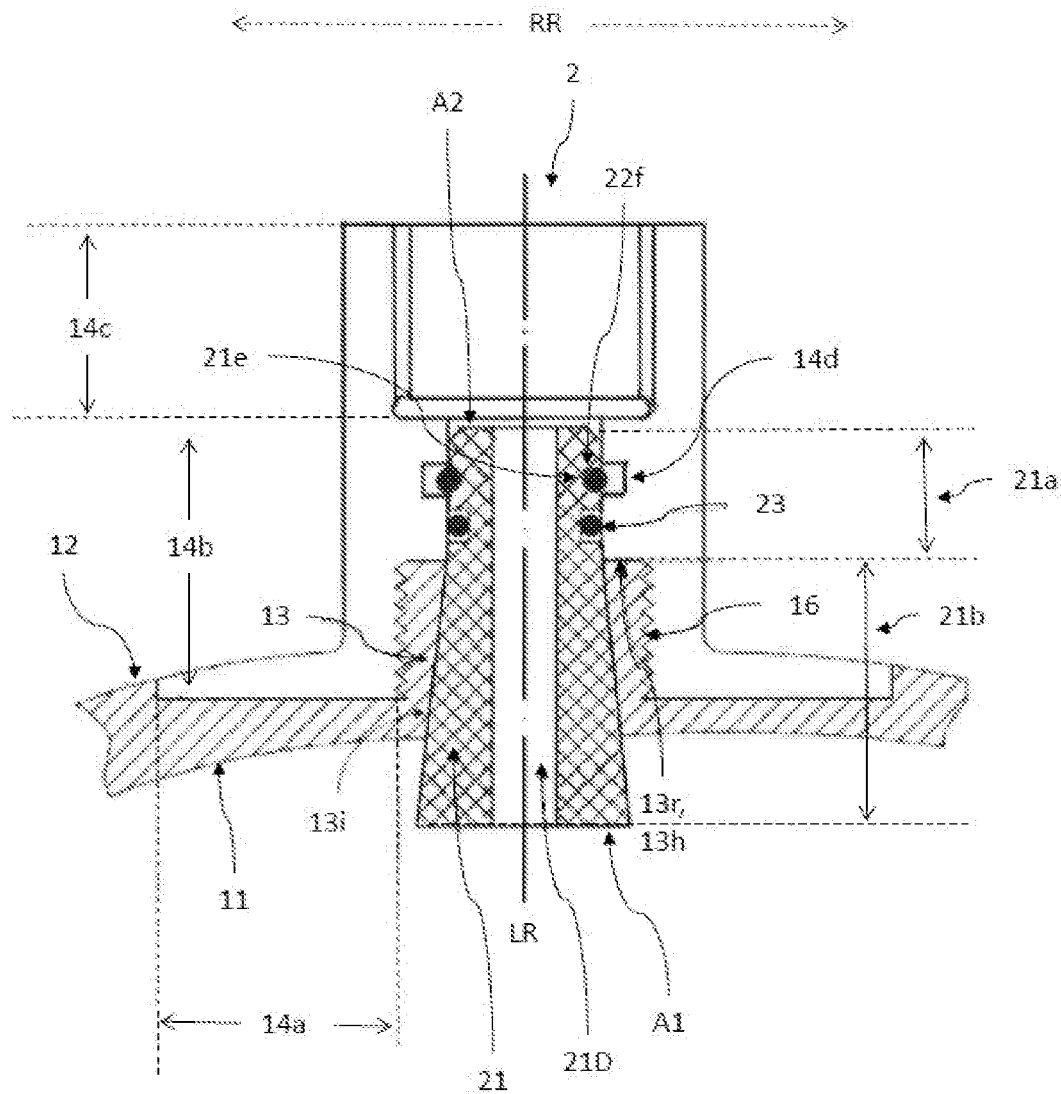
FIG. 3: an embodiment of a pressure vessel according to the invention with a pole cap according to the invention.

FIG. 3 shows another embodiment of a pole cap 1 according to the invention with a pressure port element 2, wherein the clamping nut 22*z* as the fixing element 22, as shown in FIG. 2, has been replaced here with a spring ring 22*f*. In this case the inner shape of the second contact area 14*b* of the attachment element 14 extends likewise along the first section 21*a* of the seal cone 21 and has in an area opposite the first section 21*a* a recess 14*d*, in which the fixing means 22, which is arranged from the outside on the first section 21*a*, is arranged in the shape of an elastic spring ring 22*f* (black circle). The first section 21*a* of the seal cone 21 comprises a ring recess 21*e*, which is adapted to the spring ring 22*f* (here completely filled by the spring ring 22*f*), on a position adapted thereto along the longitudinal axis LR, in which the spring ring 22*f* latches into the duct 13 after a pressing-in of the seal cone 21 along the longitudinal axis LR and thus fixes the seal cone 21 in the pressure-tight press fit, shown here, in the inner contour 13*i*. Additionally, as shown here like in FIG. 2, a seal ring 23 is arranged. For details regarding the seal ring reference is made to FIG. 2.

Figure 4:
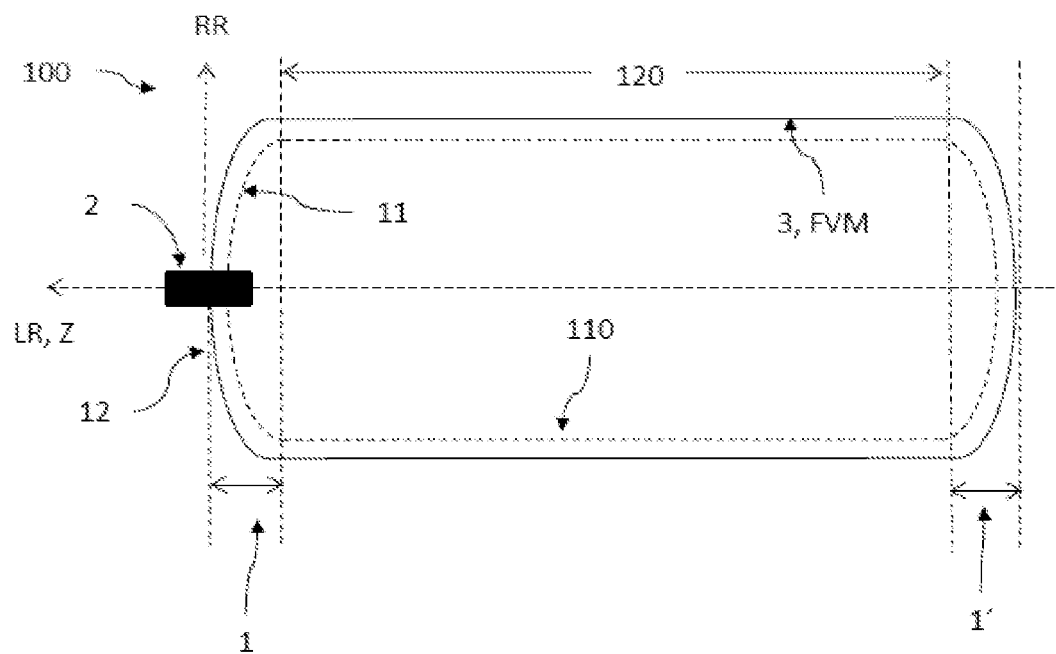
FIG. 4: another embodiment of a pressure vessel according to the invention with a pole cap according to the invention.

FIG. 4 shows an embodiment of a pressure vessel 100 according to the invention with a pole cap 1 according to the invention. Here, the fiber-reinforced pressure vessel 100 comprises an inner vessel 110 made of a plastic material with a cylinder-shaped central part 120 and two pole caps 1, 1' in each case arranged on both sides of the central part 120, which close the central part 120 on both sides. Since both the central part 120 as well as the pole caps 1, 1' are produced from plastic material, the pole caps 1, 1' can be connected in a pressure-tight manner with the central part 120 using conventional welding methods, so that the inner vessel 110 is completely produced. An outer layer made of fiber composite material 3 is wound onto the inner vessel 110 after its production, in order to reinforce the inner vessel 110 for the desired application in such a manner, that the resulting pressure vessel 100 has the necessary strength against pressure loads.

Figure 5:
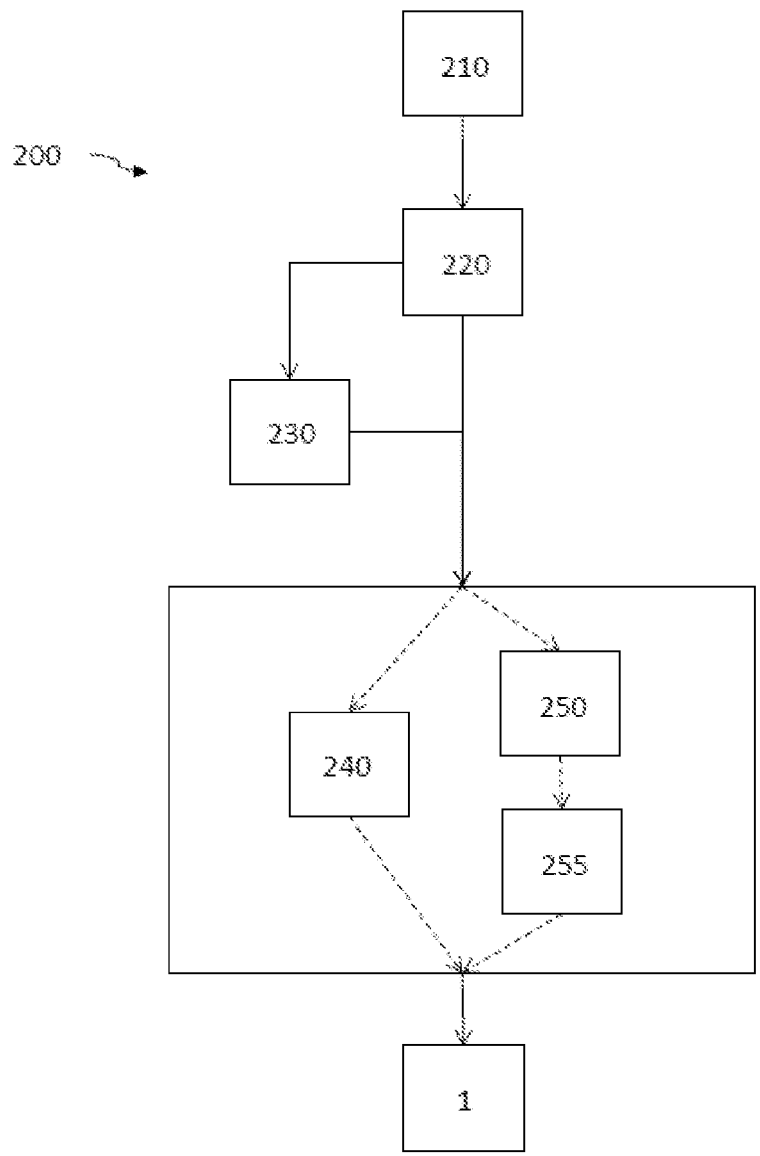
FIG. 5: an embodiment of a method according to the invention for producing the pole cap according to the invention.

FIG. 5 shows an embodiment of a method 200 according to the invention for producing the pole cap 1 according to the invention. For the detail-specific embodiment of the pole cap reference is also made to the FIGS. 1 to 3. The method 200 comprises the steps of the provision 210 of the pole cap 1 with an inner side 11 for the later closure of the pressure vessel 100, an outer side 12 for the superwinding with a fiber composite material 3 after closure of the pressure vessel 100 and a neck-shaped open duct 13, protruding outwardly to the outer side 12, with an inner contour 13*i* for the subsequent introduction of a seal cone 21 as part of a pressure port element 2; of the introduction 220 of a seal cone 21 made of metal from the inner side 13*i* into the duct 13, wherein the seal cone 21 comprises a first section 21*a* and a second section 21*b* tapering at least in the area of the duct 13 in a cone-shaped manner in direction of the first section 21*a*, until the first section 21*a* protrudes outwardly from the neck-shaped duct 13; and of the establishing 260 of a pressure-tight sealing between the seal cone 21 and inner side 13*i* of the duct 13 by means of a fixing means 22, which is arranged from the outside on the first section 21*a*, which holds the seal cone in a pressure-tight press fit in the inner contour 13*i*. In this case the method 200 in an embodiment can comprise the further step of attaching 230 an attachment element 14 to the neck-shaped duct 13 for preventing a deforming of the outer shape of the duct 13 in radial direction RR, wherein the attachment element 14 comprises a first contact area 14*a*, which extends in planar fashion in radial direction from the neck-shaped duct 13 along the outer side 12 and is adapted to the contour of the outer side 12 and is provided for the superwinding with the fiber composite material 3, and a second contact area 14*b* with an inner shape adapted to an outer shape of the neck-shaped duct 13. If the fixing means 22, which is arranged from the outside on the first section 21*a*, is a clamping nut 22*z* or a spring ring 22*f*, the step for the establishing 240 of the pressure-tight sealing can thereby comprise exerting 240 a tensile force on the seal cone 21 by means of the clamping nut 22*z* screwed from the outside onto the first section 21*a*, or the pressing-in 250 of the seal cone 21 into the duct 13, wherein the seal cone 21 in the first section 21*a* comprises a ring recess 21*e*, which is adapted to the spring ring 22*f*, on a position adapted thereto along the longitudinal axis LR, and a subsequent lock-in 255 of the spring ring 22*f* into the ring recess 21*e* of the seal cone 21, wherein the spring ring 22*f* is held elastically in a recess 14*d* in the inner shape of the second contact area 14*b* of the attachment element 14, which extends along the first section 21*a* of the seal cone 21.

Figure 6:
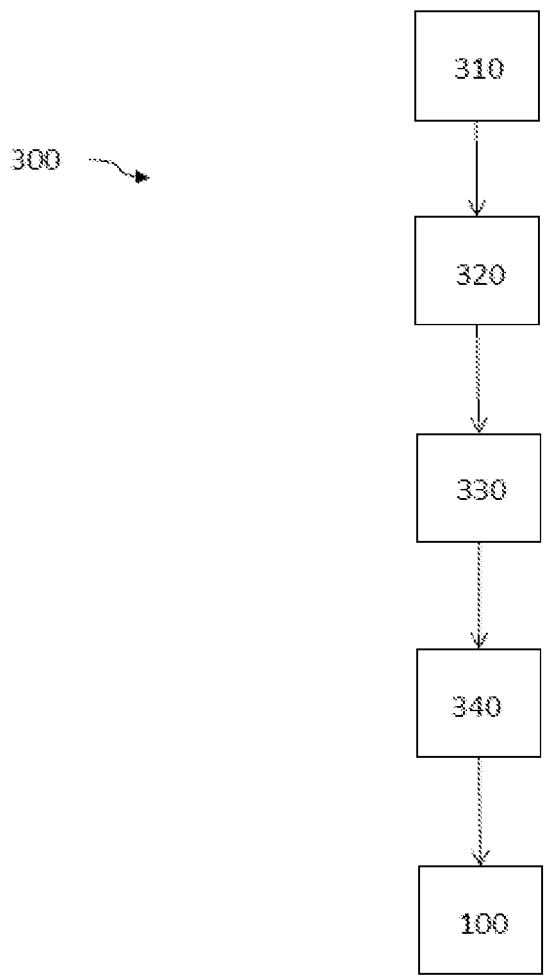
FIG. 6: an embodiment of a method according to the invention for producing a fiber-reinforced pressure vessel according to the invention.

FIG. 6 shows an embodiment of a method 300 according to the invention for producing a fiber-reinforced pressure vessel 100 according to the invention comprising the steps of the provision 310 of a cylinder-shaped central part 21 made of plastic material, the provision 320 of two pole caps 1, 1' made of plastic material for the closure of the central part 120, of which one of the pole caps 1, 1' is a pole cap 1 according to the invention, the welding 330 of the pole caps 1, 1' comprising the pole cap 1 with already connected pressure port element 2 to the central part 120 for producing an inner vessel 110 made of plastic material, and the superwinding 340 of the inner vessel 110 with fiber composite material 3 for producing the fiber-reinforced pressure vessel 100. To that end, preferably all surfaces of the inner vessel 110 are superwound with fiber composite material 3, except for the pressure port element 2. The welding method for producing the inner vessel 110 (plastic material liner) is characterized in that it is suitable for small, medium and large unit numbers, because the pre-products, extruded tube (central part 120) and injection-molded pole caps 1, can be produced in a very simple and cost-effective manner. This method 200 is particularly suitable in that only with this method pressure port elements 2 (or valve elements) can be mounted from both sides 11, 12 of the pole cap 1, as it is not possible with other methods. This can be carried out prior to the welding process, as long as both sides 11, 12 of the pole cap 1 are still freely accessible, which is not possible with the other methods (rotomolding or hose blowing method) or only by means of the duct 13 (pole cap opening).

The embodiments shown here constitute only examples of the present invention and should therefore not be understood as limiting. Alternative embodiments, which are considered by the person skilled in the art, are equally within the scope of the present invention.

LIST OF REFERENCE CHARACTERS 1, 1' Pole cap
11 Inner side of the pole cap
12 Outer side of the pole cap
13 Neck-shaped duct protruding from the outer side
13*i* Inner contour of the duct
13*h* Neck end of the neck-shaped duct
13*r* Circumferential edge at the neck end
14 Attachment element
14*a* First contact area of the attachment element
14*b* Second contact area of the attachment element
14*z* Support area of the second contact area for the clamping nut
14*c* Third area of the attachment element
14*d* Recess in the inner contour of the second contact area
14*i* Inner side of the third area of the attachment element
15 Gap between the inner side 14*i* and the first section 21*a*
16 Thread (for attachment element or clamping nut)
2 Pressure port element
21 Seal cone
21*a* First section of the seal cone
21*b* Second section of the seal cone
21D Passage channel of the seal cone
21*e* Ring recess in the first section of the seal cone
22 Fixing means
22*f* Spring ring as the fixing means
22*z* Clamping nut as the fixing means
23 Seal 24 Valve attachment
3 Outer layer from fiber composite material
100 Pressure vessel according to the invention
110 Inner vessel
120 Cylinder-shaped central part of the inner vessel
200 Method for producing the pole cap according to the invention
210 Provision of the pole cap
220 Introduction of the seal cone into the duct
230 Attaching an attachment element to the neck-shaped duct
240 Exerting a tensile force on the seal cone by means of a clamping nut screwed onto the first section from the outside
250 Pressing-in of the seal cone into the duct
255 Subsequent lock-in of the spring ring into the ring recess of the seal cone
260 Establishing of a pressure-tight sealing between seal cone and inner side of the duct
300 Method for producing the fiber-reinforced pressure vessel according to the invention
310 Provision of a cylinder-shaped central part made of plastic material
320 Provision of two pole caps made of plastic material
330 Welding of the pole caps to the central part
340 Superwinding of the inner part with fiber composite material
A1 First surface of the seal cone towards the inner side 11
A2 Second surface of the seal cone towards the outer side 12
FVM Fiber composite material
LR Longitudinal direction
RR Radial direction
Z Cylinder axis of the cylindrical central part

The invention claimed is:

1. A pole cap for a pressure-tight closure of a pressure vessel, wherein the pole cap comprises an inner side for a later closure of the pressure vessel, an outer side for a superwinding with a fiber composite material after closure of the pressure vessel and a neck-shaped open duct which protrudes outwardly from the outer side and has an inner contour, each made of plastic material, and comprises a pressure port element connected to the duct for the closure of the duct, wherein the pressure port element comprises a seal cone made of metal with a first section protruding outwardly through the duct and with a second section tapering at least in the area of the duct in a cone-shaped manner in the direction of the first section, which is held by means of a fixing means arranged on the first section from the outside in a pressure-tight press fit in the inner contour, wherein the inner contour tapers at least in an area of the duct in a cone-shaped manner outwardly along the duct, and wherein the cone-shaped inner contour is an adapted pass-fit to the cone-shaped second section.

2. The pole cap according to claim 1, wherein the seal cone protrudes with its second section from the duct beyond the inner side.

3. The pole cap according to claim 1, further comprising an attachment element for attaching to the neck-shaped duct, wherein the attachment element comprises a first contact area, which extends in a planar manner in radial direction from the neck-shaped duct along the outer side and is adapted to the contour of the outer side and is provided for the superwinding with the fiber composite material, and comprises a second contact area, whose inner shape is adapted to an outer shape of the neck-shaped duct in such a way, that the second contact area prevents a deforming of the outer shape of the neck-shaped duct in a radial direction.

4. The pole cap according to claim 3, wherein the outer shape of the duct at the neck end comprises a circumferential edge and the second contact area covers the circumferential edge at least partially, so that a deforming of the outer shape of the duct is also prevented perpendicular to the radial direction.

5. The pole cap according to claim 4, wherein the second contact area extends along the first section of the seal cone, wherein the first section comprises a suitably arranged seal circumferentially around the first section for pressure-tight sealing with respect to the second contact area of the attachment element.

6. The pole cap according to claim 3, wherein the fixing means, which is arranged from the outside on the first section, is a clamping nut screwed onto the first section, with which the second section is pressed into the inner contour for the pressure-tight sealing.

7. The pole cap according to claim 6, wherein the attachment element further comprises a third area in longitudinal direction above the second contact area, which comprises an inner side facing the first section, wherein the inner side of the third area is arranged in such a manner that a circumferential gap is formed between the inner side and the first section of the seal cone in radial direction, wherein the gap is provided and designed for the receiving of the clamping nut.

8. The pole cap according to claim 3, wherein the inner shape of the second contact area of the attachment element extends along the first section of the seal cone and has a recess in an area opposite the first section in which recess the fixing means, which is arranged from the outside on the first section, is arranged as an elastic spring ring, and the first section of the seal cone comprises a ring recess, adapted to the spring ring, in a position adapted thereto along the longitudinal axis, in which the spring ring, after a pressing-in of the seal cone into the duct, latches and thus fixes the seal cone in the pressure-tight press fit in the inner contour.

9. The pole cap according to claim 3, wherein the attachment element with its second contact area is screwed onto the outer shape of the neck-shaped duct.

10. The pole cap according to claim 9, wherein the plastic material of at least the neck-shaped duct of the pole cap is a soft plastic material and the second contact area of the attachment element is provided with a thread for self-cutting screwing onto the pole cap.

11. A fiber-reinforced pressure vessel comprising an inner vessel made of plastic material comprising a cylinder-shaped central part and two pole caps each closing the central part on both sides and an outer layer wound on the inner vessel made of fiber composite material, wherein one of the pole caps is configured according to claim 1.

12. A method for producing a pole cap made of a plastic material for a pressure-tight closure of a pressure vessel, comprising the steps of: providing a pole cap with an inner side for the later closure of the pressure vessel, an outer side for the superwinding with a fiber composite material after closure of the pressure vessel and a neck-shaped duct protruding from the outer side outwardly with an inner contour for the subsequent introduction of a seal cone as part of a pressure port element;

introduction of a seal cone made of metal from the inner side into the duct, wherein the seal cone comprises a first section and a second section tapering at least in the area of the duct in a cone-shaped manner in direction of the first section until the first section protrudes outwardly from the neck-shaped duct;

establishing of a pressure-tight sealing between seal cone and inner side of the duct by means of fixing means, which is arranged from the outside on the first section, and which holds the seal cone in a pressure-tight press fit in the inner contour.

13. The method according to claim 12, comprising the further step of attaching an attachment element to the neck-shaped duct for preventing a deforming of the outer shape of the duct in radial direction, wherein the attachment element comprises a first contact area, which extends in planar fashion in radial direction from the neck-shaped duct along the outer side and is adapted to the contour of the outer side and is provided for the superwinding with the fiber composite material, and a second contact area with an inner shape adapted to an outer shape of the neck-shaped duct.

14. The method according to claim 13, wherein the fixing means, which is arranged from the outside on the first section, is a clamping nut or a spring ring, the step for the establishing of the pressure-tight sealing comprises one of the steps of exercise of a tensile force on the seal cone by means of the clamping nut screwed onto the first section from the outside, or pressing-in of the seal cone into the duct, wherein the seal cone comprises in the first section a ring recess, which is adapted to the spring ring, in a position adapted thereto along the longitudinal axis, and subsequent lock-in of the spring ring into the ring recess of the seal cone, wherein the spring ring is held elastically in a recess in the inner shape of the second contact area of the attachment element, which extends along the first section of the seal cone.

* * * * *